United States Patent [19]

Rong

[11] Patent Number: 5,062,282

[45] Date of Patent: Nov. 5, 1991

[54] AUTOMOBILE STEERING LOCK WITH A ROD ANTI-RELEASING MECHANISM

[76] Inventor: Wang C. Rong, No. 27, Alley 74, Lane 313, Wen-Hsien Road, Tainan, Taiwan

[21] Appl. No.: 552,877

[22] Filed: Jul. 16, 1990

[51] Int. Cl.$^5$ .............................................. B60R 25/02
[52] U.S. Cl. ...................................... 70/209; 70/211; 70/238
[58] Field of Search .................................. 70/209–211, 70/215, 238, 225, 226, 252

[56] References Cited

U.S. PATENT DOCUMENTS

| | | |
|---|---|---|
| D. 289,491 | 4/1987 | Johnson . |
| D. 306,252 | 2/1990 | Johnson . |
| 3,462,982 | 8/1969 | Moore ................................. 70/209 |
| 4,103,524 | 8/1978 | Mitchell ............................. 70/209 |
| 4,304,110 | 12/1981 | Fain . |
| 4,730,470 | 3/1988 | Zane et al. ......................... 70/238 |
| 4,738,127 | 4/1988 | Johnson ............................. 70/209 |
| 4,747,279 | 5/1988 | Solon .................................. 70/238 |
| 4,848,110 | 7/1989 | Kuo ................................. 60/238 X |
| 4,856,308 | 8/1989 | Johnson . |
| 4,887,443 | 12/1989 | Wang ................................. 70/209 |
| 4,935,047 | 6/1990 | Wu ..................................... 70/209 |

FOREIGN PATENT DOCUMENTS 106072 12/1966 Denmark ........................... 70/209

Primary Examiner—Gary L. Smith
Assistant Examiner—Suzanne L. Dino
Attorney, Agent, or Firm—Bacon & Thomas

[57] ABSTRACT

An antitheft device for attachment to a steering wheel of a automobile comprising an elongated body member having a passage extending along an axis therethrough, first hook means secured to the body member for engagement with a portion of the steering wheel wherein the first hook means engage the wheel from the inside thereof with the body member extending outward beyond the periphery of the steering wheel, an elongated rod member adapted to move in telescopic fashion in the passageway of the body member along the axis, second hook means secured to the rod member for engaging the inside portion of the steering wheel diametrically opposed to the first hook means, and means associated with the body member engaging the rod within the passage that allows the rod member to extend with respect to the body member to be locked at any of a plurality of positions and prevents the rod member from being released from the body member.

1 Claim, 3 Drawing Sheets

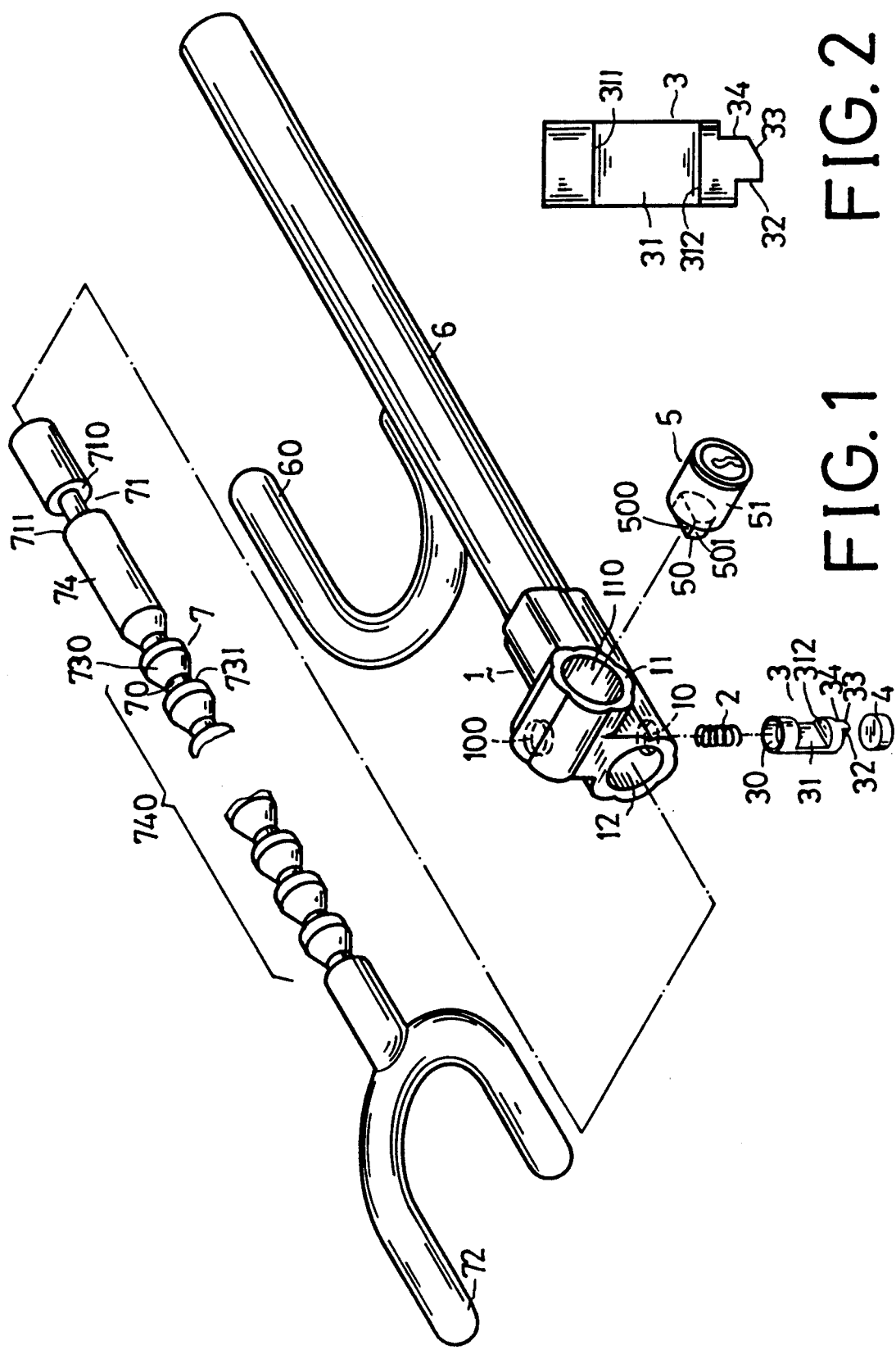

AUTOMOBILE STEERING LOCK WITH A ROD ANTI-RELEASING MECHANISM

FIELD OF THE INVENTION

The present invention relates to an automobile anti-theft device, and more particularly to a device for attachment to an automobile steering wheel to prevent complete rotation thereof for securing against unauthorized driving.

BACKGROUND OF THE INVENTION

My U.S. Pat. No. 4,887,443 discloses an automobile steering lock for attachment to a steering wheel of an automobile comprising an elongated body member having a passage extending along an axis therethrough, first hook means secured to the body member for engagement with a portion of the steering wheel wherein the first hook means engage the wheel from the inside thereof with the body member extending outward beyond the periphery of the steering wheel, an elongated rod member adapted to move in telescopic fashion in the passageway of the body member along the axis, second hook means secured to the rod member for engaging the inside portion of the steering wheel diametrically opposed to the first hook means, and means associated with the body member engaging the rod within the passage that allows the rod member to extend with respect to the body member to be locked at any of a plurality of positions. The rod member of this known antitheft device may accidentally be released from the body member by pulling the rod member too hard to extend. The releasing rod member under such condition may further hit on wind shield of the car and break it.

It is accordingly a primary object of this invention to provide an automobile steering lock that overcomes the foregoing defect associated with prior art.

Another object of this invention is to provide an automobile steering lock that performs non-return, extension only, function as in locking condition.

A further object of this invention is to provide an automobile steering lock having a mechanism for preventing a rod member thereof from being released therefrom.

BRIEF DESCRIPTION OF THE DRAWINGS

FIG. 1 is a perspective and exploded view illustrating a preferred embodiment of the present invention;

FIG. 2 is a side elevational view of a rod-like bearing of a locking mechanism to be used in the present invention;

DETAILED DESCRIPTION OF A PREFERRED EMBODIMENT

Figure 3:
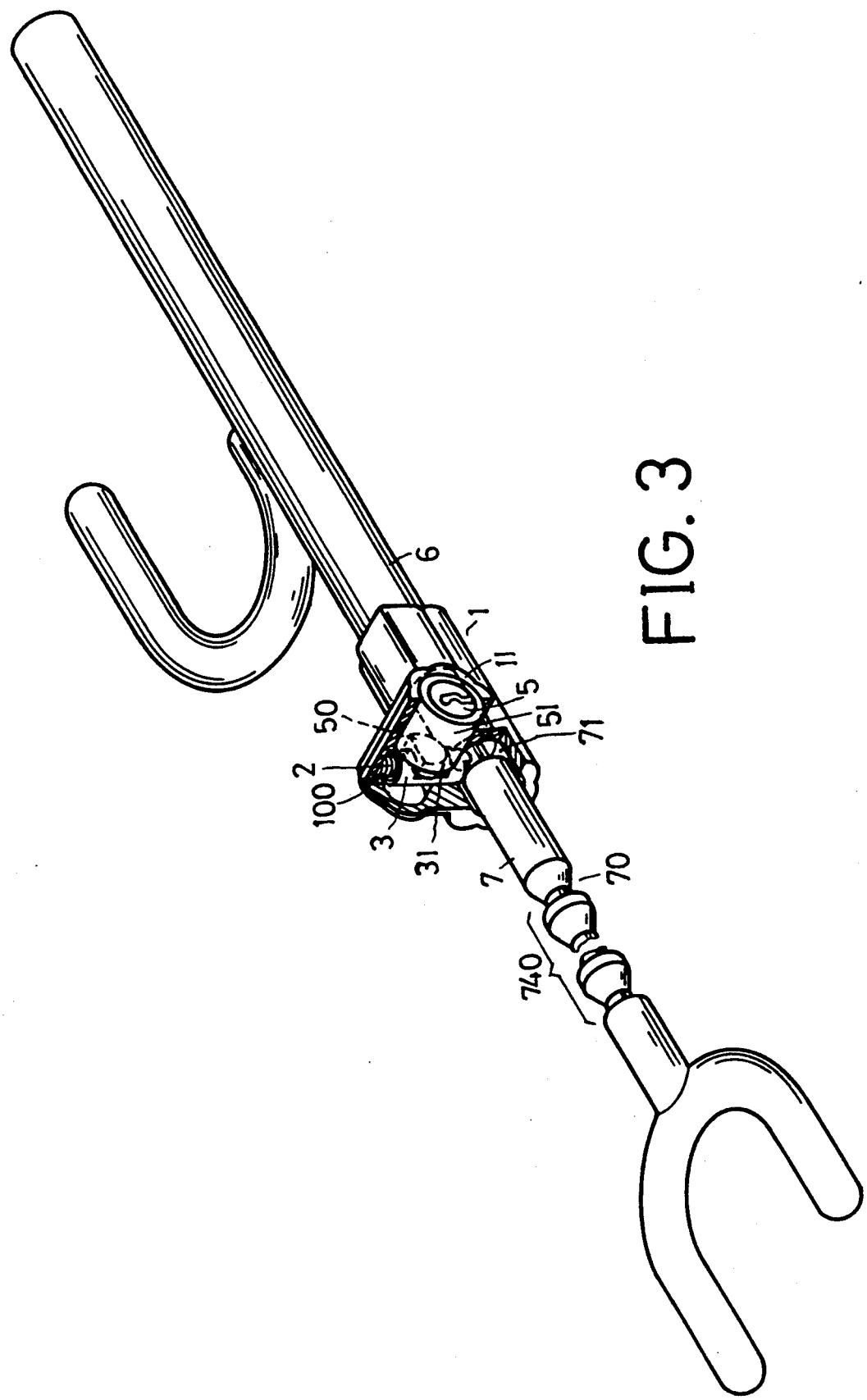
FIG. 3 is a perspective view of the device shown in FIG. 1 in assembled condition wherein a housing is partially cut off.

Referring to FIG. 1, an automobile steering lock according to the invention which comprises an elongated body member 6, an elongated rod member 7 which is dimensioned to move in telescopic fashion within body member 6, hooks 60, 72 for engaging opposed portion of a steering wheel from the inside thereof, being respectively provided on the body member 6, a locking mechanism including a locking means 5 and locating means 2, 3, being provided within the housing 1.

Said body member 6 includes an elongated tube 6 having a circular end portion (not shown) and defining a central passage (not shown) running through the body member 6. The first U-shaped hook 60 is fixedly secured to the tube 6 by means of welding adjacent the end portion such that it opens rearwardly along the body member 6. Said rod member 7 includes an elongated rod 74 of circular cross-section of which the outer diameter is dimensioned slightly less than the diameter of the central passage in the body member 6 to enable rod 74 to telescope freely within the body member 6. The second U-shaped hook 72 is fixedly secured to the front end of the rod 74 such that it opens opposite to the hook 60 for engagement with a diametrically opposed portion of a steering wheel. A plurality of annular grooves 70 axially spaced are circumferentially provided along a major portion 740 of the rod 74. Each of the annular grooves 70 consists of a vertical side wall 731 substantially perpendicular to the longitudinal direction of the rod 74 and relatively close to the second hook 72, and a convex or slope side wall 730 relatively far from the second hook 72.

Said housing 1 is formed around the end portion of the tube 6 to form an integral structure therewith wherein the central passage extends therethrough and contains the locking mechanism including the locking means 5 and locating means 2, 3.

The housing 1 includes a boss 11 integrally offset with respect to the axis of the body member 6 and having a bore 110 therethrough into the housing 1 for firmly receiving the locking means 5 which has a conventional key lock 51 and a locking member 50 which includes an arcuate outer surface 501 and a flat or recess portion 500.

To accomodate the locating means 2, 3, a second passage (not shown) is vertically bored in the housing 1. Said vertical passage interconnects the bore 11 and the passage 12 in the housing 1, extends across the bore 110 and terminates within an outer wall thereof so as to form a recess 110. A bottom hole 10 in alignment with the vertical passage is formed in an outer wall of the housing 1 to facilitate inserting the locating means 2, 3. The locating means includes a biasing spring 2 disposed within the vertical passage with one end being retained in the recess 100, and a rod-like bearing 3 having a recess 30 formed in a top end portion thereof for receiving the other end of the biasing spring 2, a tenon 32 shaped on the bottom end and protruding from the vertical passage into the passage 12 to engage an annular groove 70 of the rod 74 and a recess portion 31 defined by a flat bottom and opposed stop side walls 311, 312. A metal disc 4 is provided to be restored in the bottom hole 10 by means of a press fit after assembly. As best shown in FIG. 2, the rear side of the tenon end 32 is shaped into a vertical wall 34 and a slope bottom wall 33.

In assembly, as best shown in FIG. 3, the rod-like bearing 3 is slidably fitted in the vertical passage wherein the recess portion 31 thereof faces horizontally and the locking member 51 of the locking means 5 firmly received in the bore 110 of the boss 11 extends horizontally into the recess portion 31.

The present invention disclosed heretofore is similar to the antitheft device of my U.S. Pat. No. 4,887,443. Therefore, in operation, when the flat or recess portion 500 of the locking member 50 is oriented upwardly that allows the flat or recess portion 500 abutting on the stop side wall 311 far from the rod 74 and the rod-like bearing 3 is biased towards the rod 74 whereas the tenon 32 protrudes into an annular groove 70 to lock the device. Although in locking condition, the convex or slope side walls 730 of the grooves 70 allows the rod member 7 of this antitheft device to extend with respect to the body member 6, yet the vertical side wall engaged with the front vertical side wall of the tenon 32 prohibits the rod member 7 from telescopic movement with respect to the body member 6. When the flat or recess portion 500 is turned away from the position towards and abutting on the side wall 311, rod member 7 can move in telescopic fashion within the body member 6 by withdrawing the tenon 32 of the rod-like bearing 3 from annular groove 70 into vertical passage.

The antitheft device of the present invention, which is similar in construction and operation to the antitheft device of my U.S. Pat. No. 4,887,443, can performs a non-return function, extension only, in locking condition so that steering attachment operation of this invention can be achieved without relating key.

Figure 4:
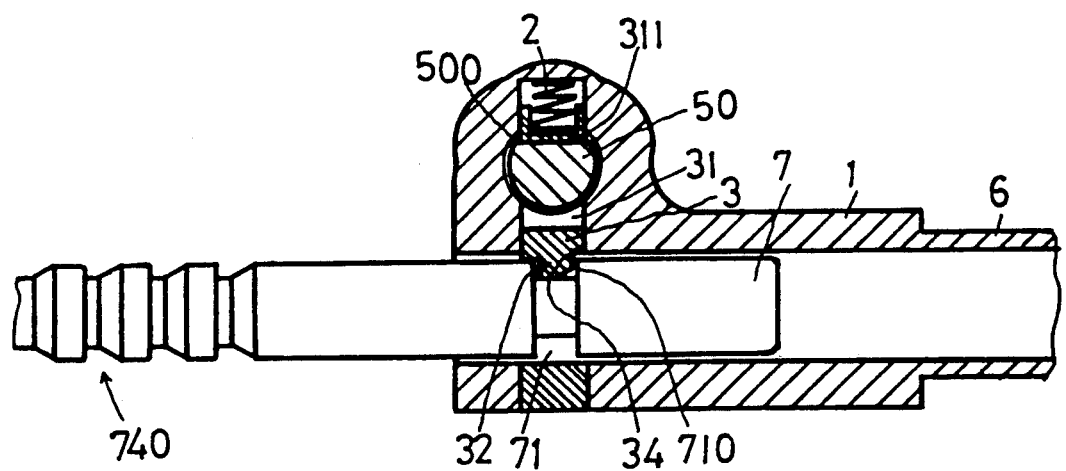
FIG. 4 is a cross-sectional view of the housing which is in engaging condition.
Figure 5:
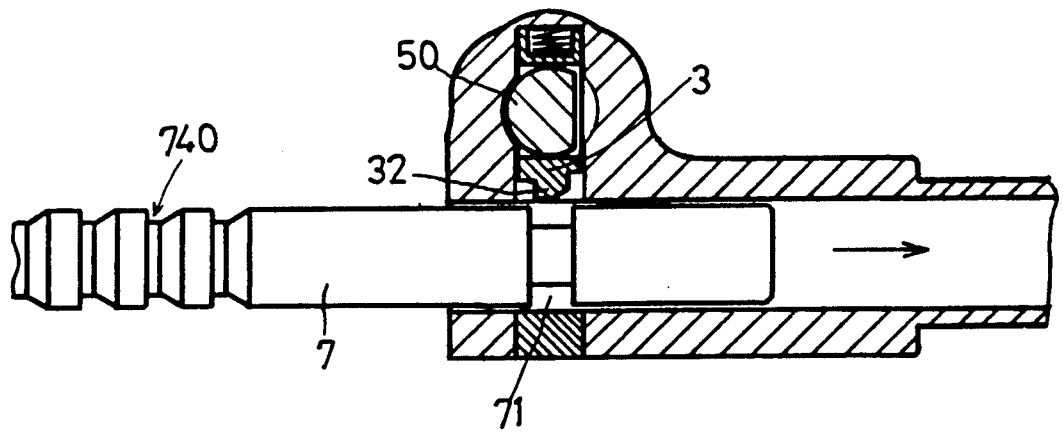
FIG. 5 is a cross-sectional view of the housing which is in disengaging condition.

As shown in FIG. 1, the end portion of the rod 74 is circumferentially formed with a groove 71 which consists of opposed vertical side walls 710, 711. As mentioned above, in extending operation of known antitheft device such as the one disclosed in my U.S. Pat. No. 4,887,443, the grooved portion 740 of the rod member 7 may be accidentally protruded from the housing 1, as shown in FIGS. 3 and 4, by pulling the rod member 7 too hard usually in its locking condition whereas the flat or recess portion 500 of the locking member 50 is oriented upwardly that allows the flat or recess portion 500 abutting on the stop side wall 311 of the recess portion 31 of the rod-like bearing 3, under biasing force of the spring 2, the tenon 32 automatically protrudes into the annular groove 71 in the end portion of the rod member 7 to stop extending movement of the rod member 71 by means of engagement between the vertical side wall 34 of the tenon 32 and the vertical side wall 710 of the groove 71 so as to prevent the rod member 7 from being released from the body member 6. As shown in FIG. 5, said rod member 7 can be retracted into normal condition by unlocking the device to withdraw the tenon 32 of the rod-like bearing 3 from annular groove 71 into vertical passage.

What is claimed is:

1. An antitheft device for attachment to a steering wheel of an automobile comprising:

an elongated tubular member having an inner end, an outer end and an elongated passageway extending along its axis therethrough, said tubular member having a first U-shaped hook portion extending therefrom with the closed end of the U-shaped hook portion generally adjacent to and slightly spaced from the inner end of said tubular member and the open end of said U-shaped hook portion facing said outer end of said tubular member, but substantially removed therefrom, said U-shaped hook portion of said tubular member further defined by a bottom leg portion generally extending in the direction of said tubular member's axis and terminating at a distance substantially removed from said outer end of said tubular member, said U-shaped hook portion of said tubular member adapted to engage said steering wheel from the inside thereof with said outer end of said tubular member extending a substantial distance beyond the periphery of said steering wheel;

a rod member having an elongated rod adapted to extend in a telescopic manner within said elongated passageway of said tubular member and a second U-shaped hook secured to one end of the rod member having an opening facing opposite to the first U-shaped hook portion and adapted to engage said steering wheel from the inside thereof;

a plurality of spaced first annular grooves each first groove defined by a vertical side wall extending generally perpendicular to the longitudinal direction of the rod member and a sloped side wall extending obliquely to the longitudinal direction of the rod member, each first annular groove circumferentially formed in a portion of the rod member;

a second annular groove defined by opposite vertical side walls extending substantially perpendicular to the longitudinal direction of the rod member and circumferentially formed in an end portion of the rod member opposite to the second U-shaped hook;

a housing means firmly formed around an end portion of the tubular member with the elongated passageway of the tubular member extending therethrough;

a lock having a locking member extending horizontally and having at least one side of longer dimension and one side of shorter dimension;

means offset with respect to the axis of the tubular member in the housing means for firmly receiving the lock;

a vertical passageway vertically formed in the housing means and interconnecting bore means and the passageway in the tubular means in the housing means;

rod-like bearing means slidably accommodated in the vertical passageway beside the lock and having a tenon member attached to an end thereof and arranged to be actuated between a locking position with the tenon member protruding into one of the first annular grooves or the second annular groove in the rod member and an unlocking position with the tenon member withdrawn from first or second annular groove and opposed vertical side walls between the locking member being controlled to position the tenon member in locking or unlocking position through the rod-like bearing member by means of the locking member; and a spring member disposed in the vertical passageway and biasing the rod-like bearing means towards the passageway in the tubular member, such that engagement of the tenon member and the second annular groove prohibits longitudinal movement of the rod member in a longitudinal direction so as to prevent inadvertent disengagement of the rod member from the elongated tubular member.

* * * * *

UNITED STATES PATENT AND TRADEMARK OFFICE
CERTIFICATE OF CORRECTION

PATENT NO. : 5,062,282
DATED : November 5, 1991
INVENTOR(S) : WANG

It is certified that error appears in the above-identified patent and that said Letters Patent is hereby corrected as shown below:  On the title page: Item [75] Inventors:

The inventor's name should be "Ching-Rong WANG" not "Wang C. Rong".

Signed and Sealed this

Third Day of August, 1993

Attest:

MICHAEL K. KIRK

Attesting Officer          Acting Commissioner of Patents and Trademarks